(12) United States Patent
Sandri Silva

(10) Patent No.: US 11,643,266 B2
(45) Date of Patent: May 9, 2023

(54) CONCENTRATED PRODUCT STORAGE CARTRIDGE FOR A DILUTING AND DISPENSING CONTAINER

(71) Applicant: André Gustavo Sandri Silva, Itajai (BR)

(72) Inventor: André Gustavo Sandri Silva, Itajai (BR)

( * ) Notice: Subject to any disclaimer, the term of this patent is extended or adjusted under 35 U.S.C. 154(b) by 166 days.

(21) Appl. No.: 16/977,906

(22) PCT Filed: Feb. 13, 2019

(86) PCT No.: PCT/BR2019/050043
§ 371 (c)(1),
(2) Date: Sep. 3, 2020

(87) PCT Pub. No.: WO2019/183696
PCT Pub. Date: Oct. 3, 2019

(65) Prior Publication Data
US 2021/0039867 A1    Feb. 11, 2021

(30) Foreign Application Priority Data
Mar. 29, 2018  (BR) .................... BR 1020180065955

(51) Int. Cl.
*B65D 81/32* (2006.01)
*B65D 51/28* (2006.01)
*B67D 7/74* (2010.01)
*B05B 11/00* (2023.01)

(52) U.S. Cl.
CPC ......... *B65D 81/3222* (2013.01); *B65D 51/28* (2013.01); *B65D 51/2864* (2013.01); *B67D 7/74* (2013.01); *B05B 11/0081* (2013.01)

(58) Field of Classification Search
CPC ............ B65D 51/2857; B65D 51/2864; B65D 51/2878; B65D 81/3222; B05B 11/0081; B05B 11/0083
See application file for complete search history.

(56) References Cited

U.S. PATENT DOCUMENTS

| | | | |
|---|---|---|---|
| 4,315,570 A | * | 2/1982 | Silver ................ B65D 81/3222 604/416 |
| 6,041,969 A | | 3/2000 | Parise |
| 6,290,100 B1 | | 9/2001 | Yacko et al. |
| 7,922,032 B2 | | 4/2011 | Mueller et al. |

(Continued)

*Primary Examiner* — Allan D Stevens

(57) ABSTRACT

The invention relates to a concentrated product storage cartridge for a diluting and dispensing container, comprising an external body, with an open lower end having a closing edge on the lower end thereof; and on the opposite end, there are flaps extending above the cylindrical tube of the external body, comprising a quick-coupling means; an opening for accessing the inner region thereof, where is placed an internal plunger, forming a filling region; and, on the upper end thereof, having quick-coupling means to be attached to the cover of cartridge. Said cover comprises upper ring flaps, arranged in order to interlock with the quick-coupling means of the internal plunger, forming a single assembly with an opening that can engage with the flaps of the external body, which are mounted in a way to provide displacement mobility in both directions downwards and upwards in relation to the internal plunger head.

11 Claims, 4 Drawing Sheets

(56) References Cited

U.S. PATENT DOCUMENTS

| | | | |
|---|---|---|---|
| 2007/0205218 A1* | 9/2007 | Mueller | B65D 81/3211 222/129 |
| 2008/0073307 A1* | 3/2008 | Sweeney | B65D 51/2864 220/521 |
| 2009/0127274 A1* | 5/2009 | Mueller | B65D 81/3222 220/789 |
| 2009/0289025 A1* | 11/2009 | Mueller | B05B 11/0081 215/44 |
| 2010/0084369 A1* | 4/2010 | Sim | B05B 11/0054 215/386 |
| 2010/0084430 A1* | 4/2010 | Sim | B65D 81/3222 222/129 |
| 2010/0089947 A1* | 4/2010 | Sim | B05B 11/3057 222/129 |
| 2011/0024454 A1* | 2/2011 | Dyrbye | B65D 51/2864 222/129 |
| 2015/0090617 A1* | 4/2015 | Reza | B65D 25/085 206/221 |
| 2015/0367368 A1* | 12/2015 | Scherer | B05B 15/30 222/383.1 |
| 2017/0297779 A1* | 10/2017 | Im | B65D 47/20 |

* cited by examiner

Section A-A'

Section B-B'

Section C-C'

Section D-D'

Section E-E'

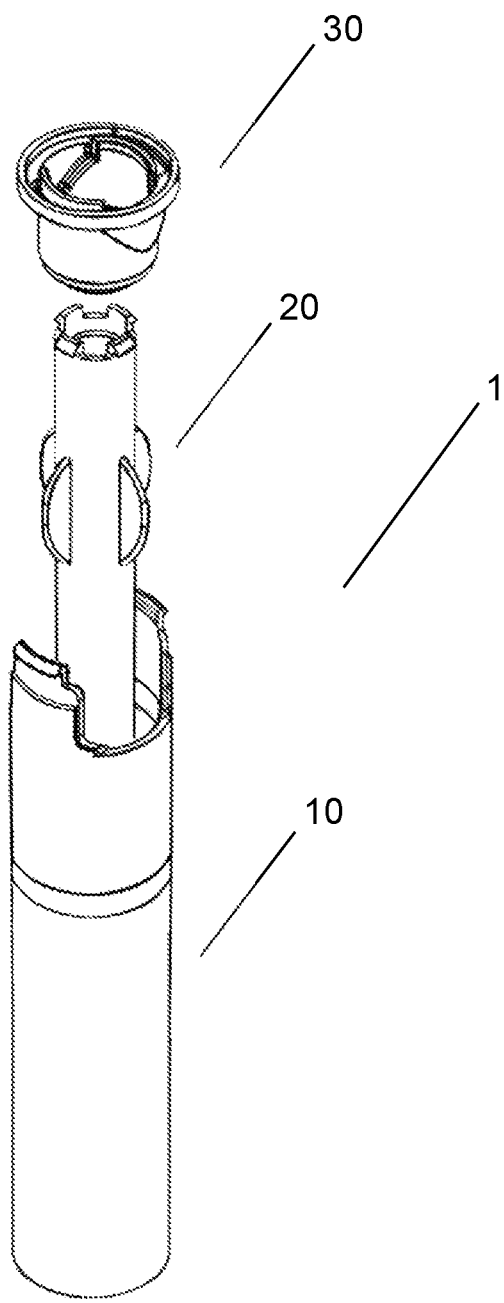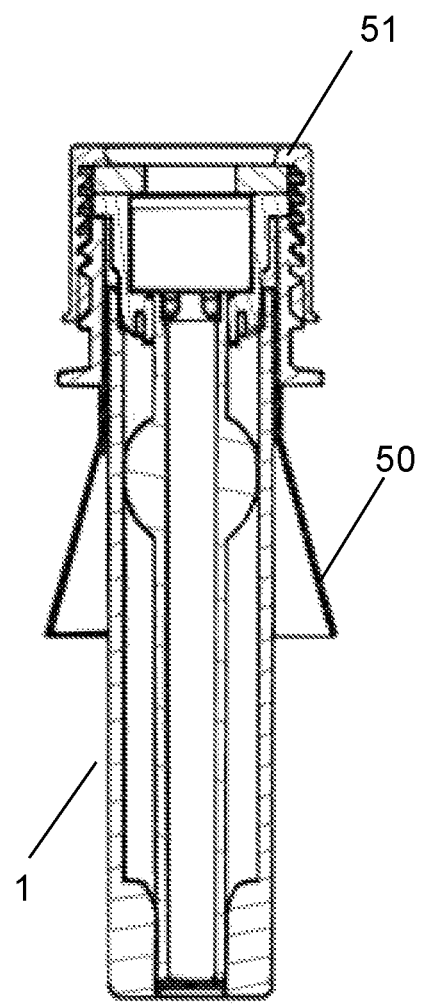
FIG. 6
FIG. 7

CONCENTRATED PRODUCT STORAGE CARTRIDGE FOR A DILUTING AND DISPENSING CONTAINER

BACKGROUND OF THE INVENTION

The invention relates to a cartridge, for storage a concentrated product, especially a liquid, or a powder, and which is fitted by its finish, in a reusable dilution and distribution container, to combine at least two separate components, one being the liquid diluent, such as water. Said cartridge is inserted and removed from the reusable dilution and distribution container. After the combined solution of concentrated material and diluent, the used cartridge, empty, is removed and can be replaced with a full one. The diluent is refilled to the dilution and distribution container and the two components are combined to form a new supply of the solution.

In many cases, it is desirable to keep the components of a multi-component system, separate from each other; and they are going to be combined just before use. This is true on systems where the components are incompatible with each other, as well as when it is desired to provide the consumer with a concentrated substance, taking advantage of its advantages, which can be diluted with water, to form a solution.

The object proposed in this document describes a cartridge for storing a concentrated substance for use in conjunction with a dispensing container, to combine the concentrated substance with a diluent material, resulting in a solution with particular performance characteristics. The most common concentrated substances usable according to the invention are detergents, that can subsequently be diluted with water to form a detergent solution of the appropriate concentration for use as a window cleaner, stain remover, disinfectant cleaner for hard surfaces, ceramic cleaners, wall cleaners, etc. However, such applications can go further, extending, for example, to other segments, such as food, beverages, segments such as pesticides, pharmaceutical and medical products, cosmetics, sanitizers, and others.

The dispensers, which are the containers used for combining the components of a multi-component system just before use, can be classified into different groups. The first group are those that use reusable containers that can be refilled with a new concentrate cartridge when the solution is spent; a second group in which the container and the concentrate cartridge are designed for a single use and subsequent disposal; and a third group in which the cartridge for the concentrate can be refilled with concentrate after being used to produce another diluted operational solution.

The object of this patent document is part, in particular, of the first group, where the containers are reusable and refilled with new concentrate cartridges; however, the cartridges could also be thought to be reusable.

STATE OF THE ART

As relevant background of this invention, we can cite documents like U.S. Pat. No. 6,290,100, which has a constructive configuration comprising a cartridge with an open lower end and opposite end, upper, with an annular flap, making out flange paper, which extends completely around from the outer peripheral surface of the body and has an annular collar connected to the interior region of the cartridge body and in the region of the flange forming a channel that is generally U-shaped in cross section of the cartridge; and an inner, plunger-like portion, which is fitted internally to the cartridge body, and which has a lock on the lower end that extends radially outwardly in order to isolate the opening of the lower end of the cartridge body; and the top of the inner portion extends beyond the top flange so that when closing the container to which the cartridge is attached, this upper part of the inner portion is contacted by the closing cap of the container, forcing it to slide down into the concentrate cartridge body, disengaging from the lower end of the cartridge body and releasing the concentrate into the dilution and distribution container.

The document U.S. Pat. No. 7,922,032 describes a cartridge for concentrate also with a configuration in which the internal plunger also moves, opening the lower region to release the concentrated liquid.

The document U.S. Pat. No. 6,041,969 also has a different construction configuration, but the operation is similar, wherein the closing of the dilution and distribution container, through its lid, it presses the upper part of the internal piston, causing it to move towards forming a lower opening and releasing the concentrated liquid.

In other words, it can be understood that these constructions, presented above, are configured in which the inner portion, that is, the plunger of the cartridge, moves downwards, to release the concentrate, keeping the body of the cartridge attached and immobile, in relation to the container.

Problems related to these constructive forms, cited previously, are in the assembly of the cartridge associated with the filling of the concentrated product. In these cited documents, the plunger must first be mounted on the cartridge body, in order to close the lower region, otherwise it would not be possible to fill it; after assembling the plunger inside the outer body, the concentrate is added, which in these cases it must be filled through the bottom of the cartridge. However, the constructive configuration of the plunger closure itself, of these types of cartridge, makes this filling procedure difficult; because, if you want to remove it or turns this filling procedure automated, you need to have more complex means, or not so efficient to make it viable, because you need to insert the plunger inside the cartridge, through its lower opening, in order to close the lower end, to prevent leakage of the liquid that will be added and, at the same time, leave some gap to allow that another element, that will carry out the filling with the concentrate product, accessing this region and filling the cartridge; and that after the cartridge full, it must be closed.

Another important aspect is how the cartridge works, regarding the releasing of the stored concentrate product. In these background documents, the outer body of the cartridge is fixed (unmoved) and the element that performs a vertical movement is the inner plunger; that is, the movement is performed by the internal element. A problem related to this operating mode is that, if the internal part that moves, preferably it must to be inserted through the lower part of the outer body, and then, after assembled, it must realize a displacement beyond from lower end of outer body, in order to provides an opening to flow the concentrate product. This displacement does not even a big problem, but the assembly of the inner plunger by the lower part of the external body generates greater difficulties, both for its use on an assembly line and for the filling process, as explained previously.

Thus, knowing the most relevant background documents of invention, as shown, it is noticed that the filling of these cartridges, with these configurations, as well as their assembly, are not very suitable for an automated process with a continuous filling system, as it does not have a construction that allows for better assembly efficiency associated to your filling process.

Advantages of the Invention

The purpose of this patent document is to show a cartridge, which allows easy assembly, easy fabrication, easy filling process, suitable for a production in line, that could be completely automated.

It is characterized by safety, functionality and ease of manufacture, making it considerably better than the devices already known; in particular, the cartridges mentioned above. Its construction comprises three main parts: the external body, the internal plunger (which is the internal body) and the cover. And they have a configuration that allows them to be assembled, in order to the plunger, which is the internal part of the cartridge, remains fixed (unmoved), attached to the cover, that has the role of the cartridge flange, and the external body is also mounted on its cover; however, it is the external body that moves vertically to release the concentrate. This configuration allows the upper part of the cartridge to remain open after the plunger is positioned, before the cover is disposed; the cover is placed only after filling the cartridge. In this way, this configuration allows ease assembly, ease filling of the concentrate in the cartridge, even in automated process lines. After its filling, the cartridge cover is attached on the plunger, so that it will also secure the external body. This constructive configuration is suitable to be used in a production and automated line.

The advantage of this configuration is that it allows an automatic cartridge filling system, on a large scale and in a totally efficient configuration. Becoming compatible to be arranged in a production line, it can be fully automated, in which the external body of the cartridge is placed on a suitable base, then the internal plunger is placed internally to said external body, the product is then filled and then the capsule is closed through its cover.

The filling is carried out from the top of the cartridge; this constructive configuration allows a larger opening to position the filling mean, for example a filling spout.

The configuration presented also facilitates the handling of the cartridge, even a certain ease in operating it with hands.

The cartridge can be manufactured economically, be assembled more efficiently, and be more suitable for filling by automated processes, resulting in reduced filling time and assembly time.

Another characteristic of the object proposed in this document is that the said cartridge incorporates structural and constructive characteristics, in order to enable it to be filled by its upper part; and it is the cartridge external body that slides in relation to the internal plunger, to release the stored concentrated product.

Another advantage is related to the simplified geometry of the three parts that comprise the cartridge, so that the construction of these parts, and their assembly, can be accomplished in a few steps.

DESCRIPTION OF THE DRAWINGS

The drawings, presented below, as an example and illustration, and later described in more detail, will help in a better understanding of the object revealed in this patent document.

FIG. 6 shows an exploded view illustrating the cartridge.

FIG. 7 shows a sectional view to illustrate the disposition of the cartridge to the dilution and distribution container.

DETAILED DESCRIPTION OF THE INVENTION

Figure 1A:
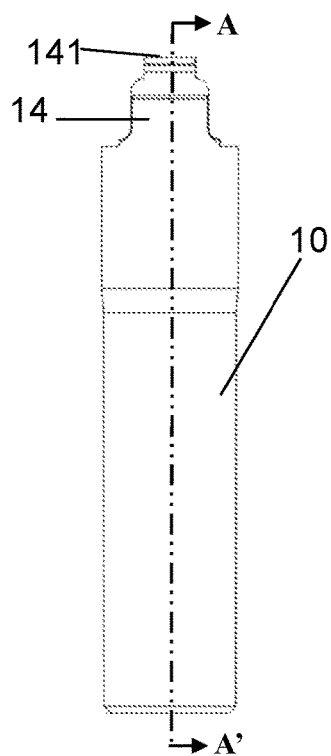
FIGS. 1A, 1B and 1C show the external body of the cartridge illustratively.
Figure 1B:
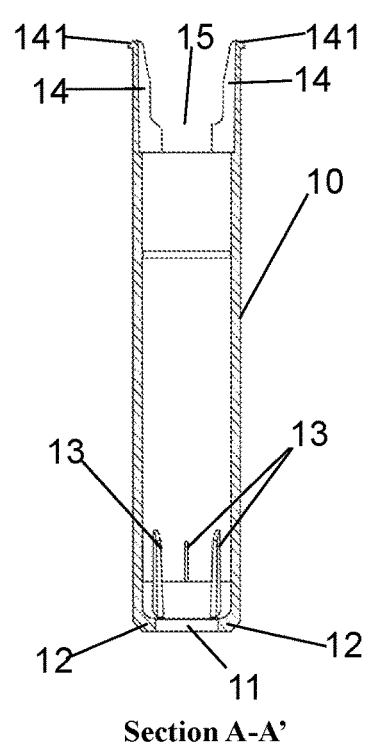
Figure 1C:
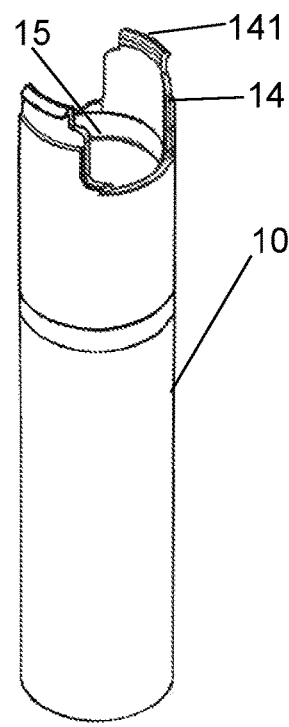
Figure 2A:
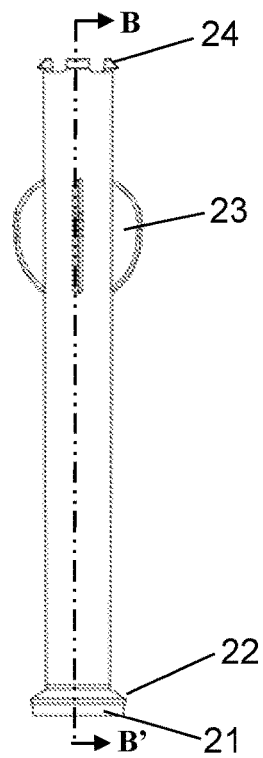
FIGS. 2A, 2B and 2C, illustratively show the internal body of the cartridge, called the internal plunger.
Figure 2B:
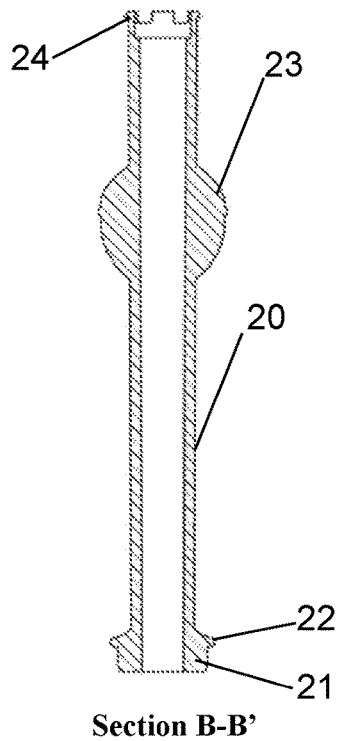
Figure 2C:
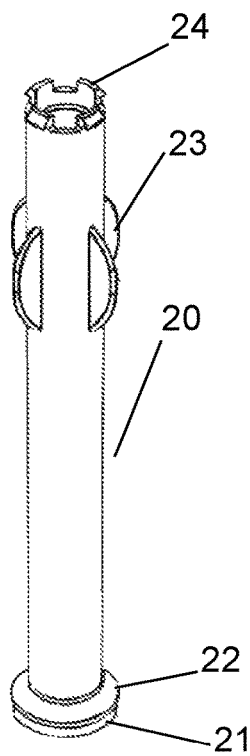

As shown in the drawings, the object of this patent document is a cartridge (1) which is comprised of three main parts: an external body (10), FIGS. 1A, 1B and 1C, an internal plunger (20), FIGS. 2A, 2B and 2C, and a cover (30), 3A, 3B and 3C, all essentially cylindrical. In particular, the internal plunger (20) must have a compatible dimension to be placed coaxially internally to the external body (10), in order to form a region (40) to be filled with the concentrate product, as shown in FIG. 4B. The cover (30) is arranged to be attached to the external body (10) at its upper end, as well as to hold the internal plunger (20) also by its upper end.

The external body (10), according to FIGS. 1A, 1B and 1C, has an outer diameter slightly smaller than the inner diameter of the neck portion of the dilution and distribution container (50) (FIG. 7) to be inserted; and is provided with a main hollow cylindrical body, an open lower end (11) having a closing edge (12) that extends radially inward, acting as a stop for the plunger head (21), as well as providing inner fins (13) with configuration that serve as a guide for the plunger head (21) of the internal plunger (20) towards the open lower end (11) of said external body (10). The upper, opposite end of the external body (10) comprises at least two flaps (14) extending beyond the cylindrical tube, comprising quick-coupling means (141) preferably arranged on the end of said flaps (14) and to be able to provide a stop in this region of the flaps (14); and comprises an opening (15) for access to its internal region. These flaps (14) are contoured preferably in curved lines with a certain inclination, this inclination befitting with the inclinations of the cover (30) detail, to facilitate the correct direction of the said cover (30) in this region, when assembling the cartridge (1).

The internal plunger (20), according to FIGS. 2A, 2B and 2C, is also a hollow body, to allow the passage of other elements into the container (50), if necessary, such as a dip tube, for example. It has a diameter that is sufficiently smaller than the internal diameter of the external body (10) in order to be positioned inside it creating a region (40) for storing the concentrate product. At the lower end, the plunger head (21) has a diameter greater than the diameter of the body of said internal plunger (20) and compatible to position itself in close fit with the open lower end (11) of the external body (10); a small projection (22) is also provided in this plunger head (21), having a compatible diameter, and being positioned on the closing edge (12) of the external body (10) acting as a flange and ensuring a tight closure of the region (40). The external region of the internal plunger (20) comprises external fins (23), preferably longitudinal and presenting a smooth contour and a more external dimension close to the internal diameter of the external body (10), in order to pass close to the internal wall of said external body (10) and ensure a better longitudinal positioning of the internal plunger (20) when placed internally to the external body (10). In the region of the upper end of the internal plunger (20), is comprised quick-couplings (24) to be attached next to the cover (30), forming a single set, attached together.

Figure 3A:
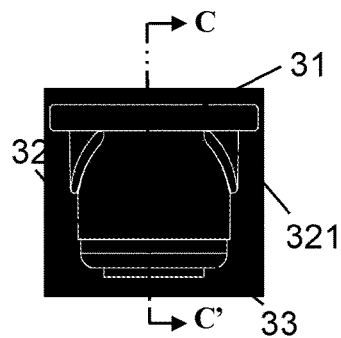
FIGS. 3A, 3B illustrate the cartridge cover.
Figure 3B:
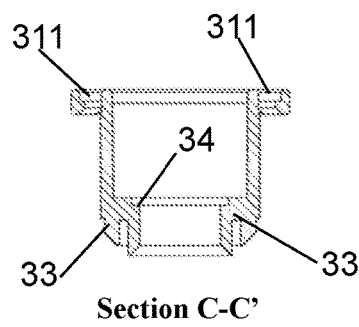
Figure 3C:
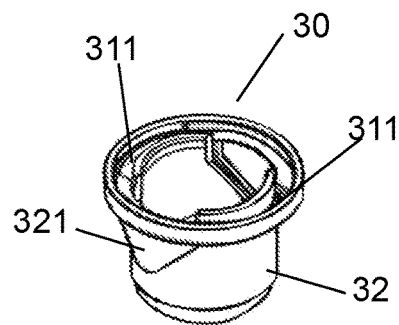

The cover (30) of the cartridge (1), according to FIGS. 3A, 3B and 3C, has an annular and hollow shape, also acts as a flange through its upper annular flap (31), with a diameter greater than the opening of the container (50) into which the cartridge (1) is inserted; said annular flap (31) comprises an opening (311) compatible to fit the flaps (14) of the external body (10); they are assembled in a way that said external body (10) has a small displacement mobility in one orientation, for both directions, but with difficult to disengaging the quick-coupling means (141) disposed in said flap (14), which also acts as an end stop for the displacement of the external body (10) in the downward direction. The cover (30) comprises a body (32) with a diameter sufficiently smaller than the internal diameter of the external body (10) in order to position itself internally to said external body (10) in its upper region; the body (32) also provides a highest surface (321) with a diameter greater than the internal diameter of the external body (10) and with contours preferably in curved lines and with a certain inclination befitting to the inclination of the flaps (14) of the external body (10), in order to act as a guide to easily guarantee the correct orientation and positioning of the cover (30) in the opening (15), of the external body (10), at the time of assembly, directing each of the flaps (14) to each one of the openings (311) and being positioned, each highest surface (321) in the gaps between the flaps (14) and also acting as an end stop for the displacement of the external body (10) in the upward direction. The lower region of said cover (30) has a smaller diameter especially in the internal region, in order to form a closure (33) with a sufficiently compatible dimension to seal the upper part of the region (40) for storing the concentrated product; this lower region of the cover (30) also comprises stops (34) arranged in a compatible manner to be fitted with the quick couplings (24) of the internal plunger (20), coupling said internal plunger (20) with the cover (30) creating a single set attached to each other.

Figure 4A:
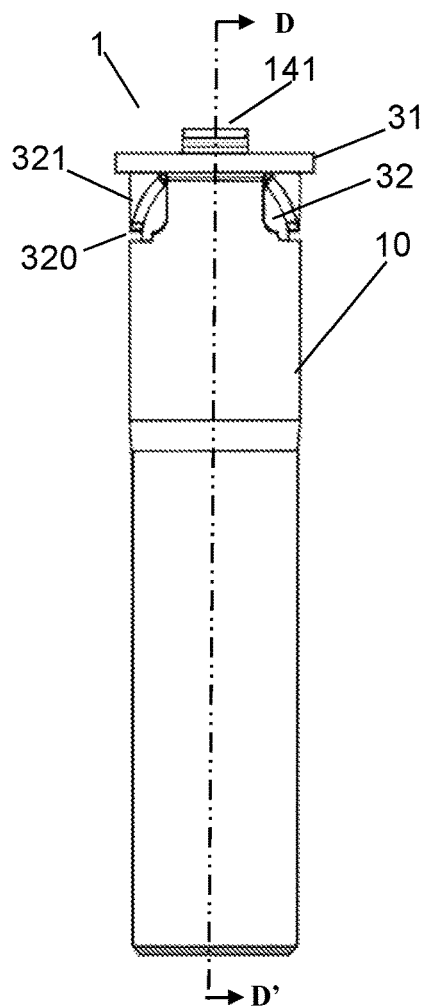
FIGS. 4A, 4B illustrate the assembled cartridge in its closed condition.
Figure 4B:
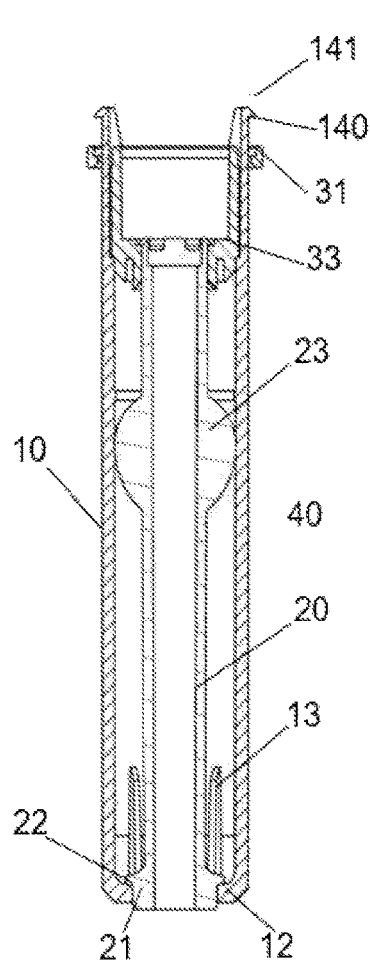
Figure 4C:
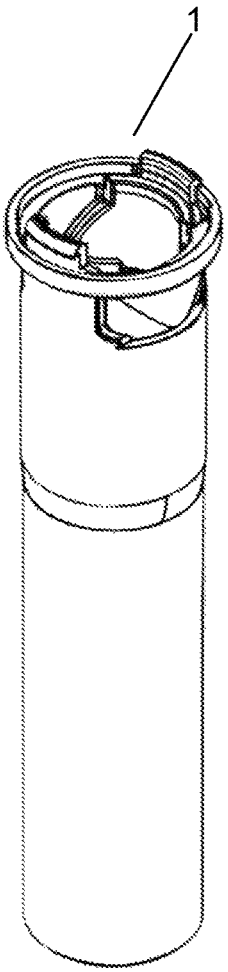

The FIGS. 4A, 4B and 4C, show the assembly of the cartridge (1) in its closed condition, in which the external body (10) receives the internal plunger (20) internally, showing more clear the role of the inner fins (13) of the external body (10), in order to guarantee and facilitate the correct positioning of the plunger head (21) of the internal plunger (20) next to the opening (11); the role of the external fins (23) of the internal plunger (20) in order to guarantee its correct longitudinal positioning when mounted internally to the external body (10); and facilitating the understanding of how the cover (30) is assembled and fitted, being attached to the internal plunger (30) by means of its quick-couplings (24) properly positioned in the stops (34) and the flaps (14) being properly positioned in the openings (311), with fitting being aided by the highest surface (321) and by the quick coupling means (141) as a limit stop for the displacement of said external body (10). The displacement of the external body (10) vertically, in the "down" and "up" direction is proportional to the spacing (140) between the quick-coupling means (141) and the annular flap (31), or the spacing (320) between the highest surface (321) and the upper end of the external body (10) wall.

Figure 5A:
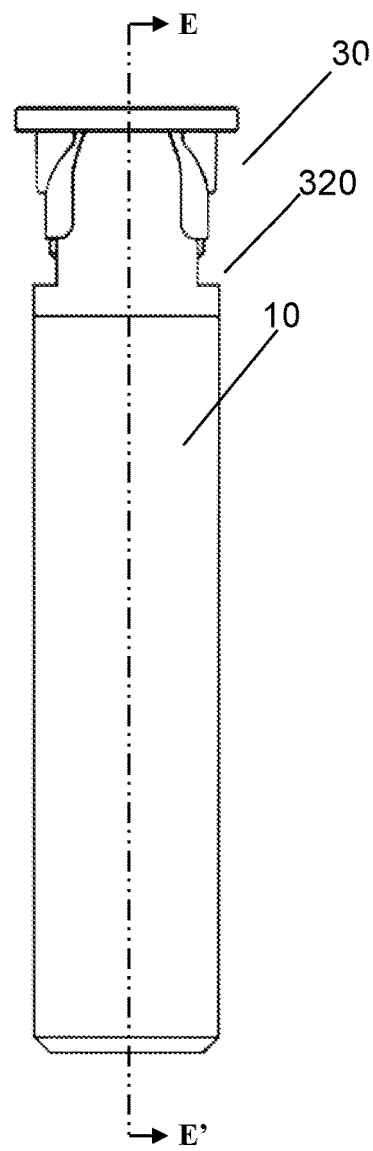
FIGS. 5A, 5B and 5C, illustrate the assembled cartridge in its open condition.
Figure 5B:
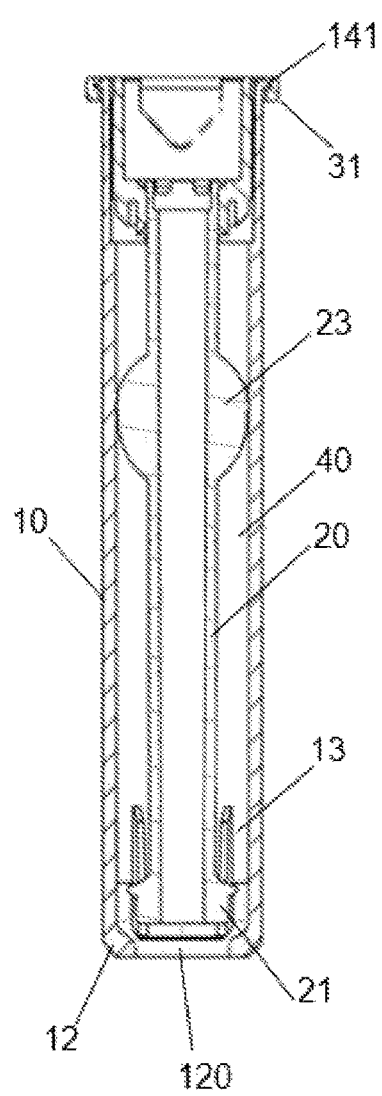
Figure 5C:
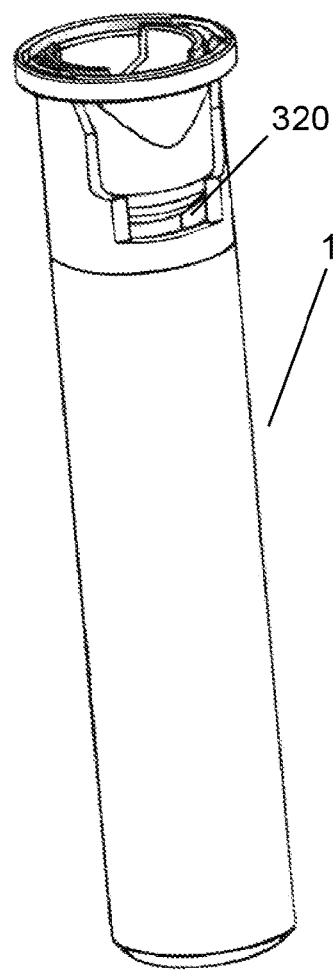

The FIGS. 5A, 5B and 5C show, illustratively, the cartridge (1) assembled, as previously explained, but in its open condition, that is, with the external body (10) displaced, spaced in relation to the plunger head (21), creating a circular opening (120) between the plunger head (21) and the closing edge (12) that allows the concentrate product flowing, releasing it from the region (40) into the interior of the container (50), to then be mixed and after distributed. At the top, the spacing (320) remains and the spacing (140) disappears, because the quick-coupling means (141) is close to the annular flap (31), part of the cover (30), that do the role the end stop to the displacement of the external body (10).

The FIG. 6 shows an exploded view of the cartridge (1) showing how it is assembled. For automated assembly and filling, the external body (10) can be positioned on a compatible base, which runs on a conveyor belt, or which rotates on a carousel, for example, and the internal plunger (20) are placed internally into the said external body (10), manually or automated, since the constructive configuration, as already described in detail, thus makes it possible. In this way, the open lower end (11) of the external body (10) is already sealed tightly by the plunger head (21), and the opening (15) of the external body (10) remains open giving full access to the region (40) of filling of the concentration product. Therefore, this region (40) can be filled by manually or automated process, in a simple way, with the need of a feeding head compatible with needles or other means that allows the disposal of the concentrate product internally to the region (40), until its fill. After the region (40) duly filled, the cover (30) can then be mounted manually or automatically, positioning it on the external body (10) and which, through its highest surface (321), will be properly guided so that the quick-couplings (24) are positioned in the stops (34) and so that the flap (14) is positioned in the opening (311), being then properly attached and fitted by a simple pressing on the cover (30).

The displacement of the external body (10) can be carried out by the direct action of the hands or, as is most commonly done, by the action of the lid (51) of the container (50) that in contact to the end of the flaps (14) press the external body (10) down.

The cartridge (1) object of this patent document, as shown in FIG. 7, as an example, is placed, already assembled, into the upper opening of the container (50), containing a solvent, for example, water. In this case, the external body (10) is positioned completely inside the container (50), until the annular flap (31) part of the cover (30) overlaps against the edge of the container (50) opening. After that, the container (50) can then be closed with its lid (51), which can be a simple cap, or some distribution element, such as a nozzle. The central region of the cartridge (1) has a through hole to allow the passage of other elements into the container (50), if necessary, such as a dip tube, for example. During the closing of the lid (51) of the container (50) the inner region of the top of said lid (51) touches the end of the flap (14) putting a pressure of the entire external body (10) downwards, promoting its displacement axial, so that the closing edge (12) of the external body (10) moves away from the plunger head (21), which is attached to the cover (30), thus forming the circular opening (120) that allows the concentrate product to flow, releasing it from the region (40) into the container (50), to then be mixed and then distributed.

Thus, the release of concentrated product from the cartridge (1) is carried out by the displacement of the external body (10) in relation to the internal plunger (20) that remains immobile in relation to the distribution container, together with the cover (30).

Said cartridge (1), it has simple construction, with few parts, and its assembly also takes place in a very simple way; likewise, its configuration was designed especially to enable its use in a large-scale production line and filling process. It can be manufactured with different dimensions, and coupled in different containers, as long as the said container has a compatible opening for its placing. Said cartridge (1) can provide internal division (not shown), arranged in the region (40) of storing of the concentrate, in order to form different compartments, thus allowing the storage of different concentrates in each of these compartments. In addition, any constructive variation that carries with it the inventive concept presented here, must be interpreted by a technician in the subject, as an obvious consequence of the object revealed in this document.

The invention claimed is:

1. A concentrated product storage cartridge for a diluting and dispensing container, the cartridge (1) comprising a hollow external body (10), an internal plunger (20) and a cover (30), wherein:
   the hollow external body (10) defines a first internal region having a first internal diameter, a first opening (11) and a second opening (15), wherein the first opening (11) and the second opening (15) provides access to the first internal region, wherein the hollow external body (10) comprises a hollow external body upper end, a hollow external body lower end opposite the hollow external body upper end, a cylindrical tube, at least two flaps (14) and a closing edge (12) wherein:
      the first opening (11) is defined at the, hollow external body lower end, wherein the first opening (11) is defined by the closing edge (12) extending radially inward;
      the at least two flaps (14) extend from the cylindrical tube;
      each of the at least two flaps (14) has an end, and each of the at least two flaps (14) comprises an external body quick-coupling means (141) preferably arranged at the end; and
      the second opening (15) is defined at the hollow external body upper end;
   the internal plunger (20) comprises a plunger hollow body having a plunger body diameter, a plunger lower end, a plunger upper end opposite the plunger lower end, a plunger head having a plunger head diameter and plunger quick-couplings (24) wherein:
      the plunger body diameter is sufficiently smaller than the first internal diameter of the hollow external body (10), compatible to permit the internal plunger to be received through the second opening (15), and placeable coaxially inside the hollow external body (10) to define a filling region (40), wherein the filling region (40) is to be filled with the concentrate product;
      the plunger head (21) is provided at the plunger lower end, wherein the plunger head diameter is greater than the plunger body diameter, and the plunger head diameter is compatible to position the plunger head (21) in a close fit with the first opening (11) of the hollow external body (10); and the plunger quick-couplings (24) are provided at the plunger upper end, wherein the plunger quick-couplings (24) are compatible to be attached next to the cover (30); and
   the cover (30) comprises stops (34) and an upper annular flap (31), wherein:
      the stops (34) are arranged to be fitted to the plunger quick-couplings (24) of the internal plunger (20), wherein attaching said internal plunger (20) with said cover (30) forms a set; and
      the upper annular flap (31) defines third openings (311), wherein the third openings (311) are compatible to fit the at least two flaps (14) of the hollow external body (10), to form an assembly, wherein said hollow external body (10) has displacement mobility in one orientation, in both directions, going downward and upward, in relation to the plunger head (21) of the internal plunger (20), and when going downward, forms a circular opening (120) between the plunger head (21) and the closing edge (12) in order to allow release of the concentrate product, stored in the filling region (40).

2. The concentrated product storage cartridge for the diluting and dispensing container according to claim 1, wherein the cover (30) comprises a cover body (32), wherein the cover body (32) comprises an upper body region having an upper body diameter and a lower body region having a lower body diameter, wherein:
   the cover (30) has an annular shape and the cover (30) is hollow;
   the upper body diameter is sufficiently smaller than the first internal diameter of the hollow external body (10) in order to position said cover (30) internally to said hollow external body (10); and
   the lower body diameter is smaller than the upper body diameter, in order to form a closure (33), wherein the lower body diameter has a sufficiently compatible dimension to seal tightly an upper part of the filling region (40).

3. The concentrated product storage cartridge for the diluting and dispensing container according to claim 1, wherein the hollow external body (10) comprises internal fins (13), wherein the internal fins (13) are provided at the hollow external body lower end of the hollow external body (10).

4. The concentrated product storage cartridge for the diluting and dispensing container according to claim 3, wherein the internal fins (13) are set up longitudinally to the hollow external body (10).

5. The concentrated product storage cartridge for the diluting and dispensing container according to claim 1, wherein the plunger head (21) comprises projection (22) with a compatible diameter to be placed on the closing edge (12), in order to act as a flange which ensures watertight closing of the filling region (40).

6. The concentrated product storage cartridge for the diluting and dispensing container according to claim 1, wherein the cover (30) comprises cover body (32), wherein the cover body comprises highest surfaces (321), wherein the highest surfaces (321) comprises a highest surfaces diameter, wherein the highest surface diameter is greater than the first internal diameter of the hollow external body (10), and the highest surfaces (321) are placed in gaps between the at least two flaps (14) of the hollow external body (10).

7. The concentrated product storage cartridge for the diluting and dispensing container according to claim 6, wherein the highest surfaces (321) have a contour shaped to guide the at least two flaps (14) to the third openings (311) during assembly.

8. The concentrated product storage cartridge for the diluting and dispensing container according to claim 1, wherein the internal plunger (20) comprises an external surface and external fins (23), wherein the external fins (23) are provided on the external surface.

9. The concentrated product storage cartridge for the diluting and dispensing container according to claim 8, wherein the external fins (23) have a smooth contour and defines an outer dimension, wherein the outer dimension is close to the first internal diameter of the hollow external body (10).

10. The concentrated product storage cartridge for the diluting and dispensing container according to claim 1, wherein a first spacing (140) is defined between the external body quick-coupling means (141) and the upper annular flap (31).

11. The concentrated product storage cartridge for the diluting and dispensing container according to claim 6, wherein a second spacing (320) is defined between highest surfaces (321) and a first end of the cylindrical tube of the hollow external body (10).

* * * * *